United States Patent
Goshima

[15] 3,703,774
[45] Nov. 28, 1972

[54] MAGNETIC RECORDING-REPRODUCING DEVICE CAPABLE OF AUTOMATIC REPETITIVE REPRODUCTION

[72] Inventor: Takeshi Goshima, Tokyo, Japan

[73] Assignee: Canon Kabushiki Kaisha, Tokyo, Japan

[22] Filed: Nov. 17, 1970

[21] Appl. No.: 90,407

[30] Foreign Application Priority Data

Nov. 21, 1969 Japan ......................44/13434

[52] U.S. Cl.....35/35 C, 179/100.2 MD, 179/100.2 S
[51] Int. Cl..................................................G09b 5/04
[58] Field of Search.....................35/35 C; 179/100.2 MD, 100.2 S, 179/100.2 Z

[56] References Cited

UNITED STATES PATENTS

| | | | |
|---|---|---|---|
| 2,876,561 | 3/1959 | Horne | 35/35 C |
| 3,059,348 | 10/1962 | Mezzacappa | 35/35 C |
| 3,269,033 | 8/1966 | Redfield et al. | 35/35 C |
| 3,405,461 | 10/1968 | Joslow | 35/35 C |
| 3,556,535 | 1/1971 | Chabot | 179/100.2 Z |
| 3,566,138 | 2/1971 | Gottshall | 179/100.2 Z |

FOREIGN PATENTS OR APPLICATIONS 771,104   3/1957   Great Britain ............35/35 C

*Primary Examiner*—Wm. H. Grieb
*Attorney*—Ward, McElhannon, Brooks & Fitzpatrick

[57] ABSTRACT

A magnetic recording-reproducing device, especially suitable for educational purposes or for dictation, which is capable of automatic repetitive reproduction by using a master tape storing therein information units of various lengths and time signals representing the various lengths of such information units. The information units are transferred from the master tape onto a plurality of endless magnetic recording mediums having different lengths, whereafter any particular one of the endless magnetic recording mediums is played back in accordance with a corresponding one of the time signals to thereby repeatedly reproduce the information unit on that particular medium.

8 Claims, 7 Drawing Figures

FIG. 1
FIG. 2
FIG. 3
FIG. 4
FIG. 6
FIG. 5
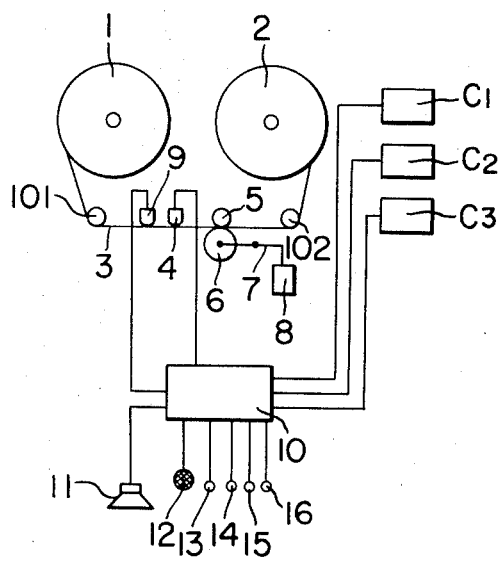
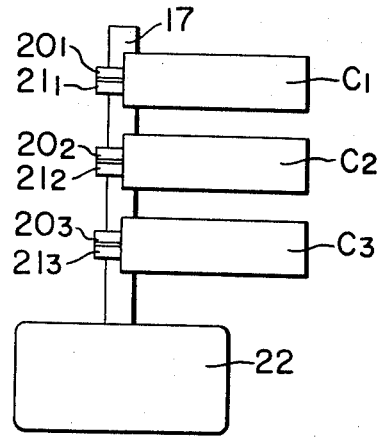
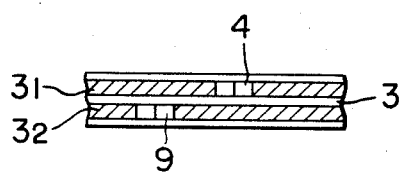
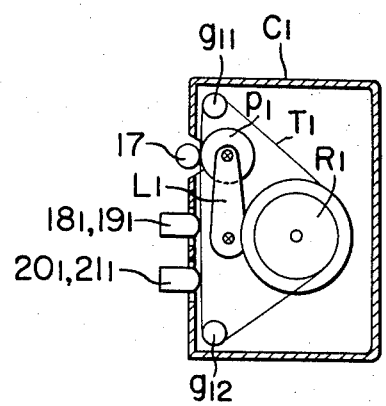
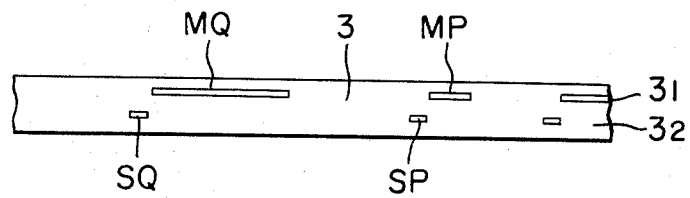
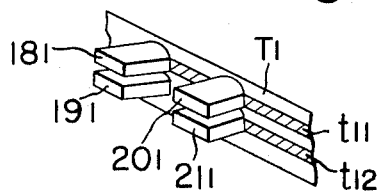

MAGNETIC RECORDING-REPRODUCING DEVICE CAPABLE OF AUTOMATIC REPETITIVE REPRODUCTION

BACKGROUND OF THE INVENTION

1. Field of the Invention

This invention relates to a magnetic recording-reproducing device, and more particularly to a magnetic recording-reproducing device capable of automatic repetitive reproduction in which the cycle of reproducing operation may be variable in several ranges.

2. Description of the Prior Art

Magnetic recording-reproducing devices have been widely used for educational purposes, especially in the foreign language speaking training, or for dictation in offices and the like. The use of magnetic recording-reproducing devices as means of education or dictation is attributable mostly to the fact that such devices can record and reproduce speech signals very easily and repeatedly and that repeated reproduction of recorded information is very often required in the process of language learning or in dictation. This will be better understood by taking as an example the case of foreign language learning.

In foreign language learning, especially as viewed in the aspect of speaking ability, it is well known to repeat aural-oral practice with the same teaching material in order to achieve a greater learning effect. In learning to speak a foreign language, it is essential to orally imitate each given sentence pattern as a whole including its intonation and pronunciation of individual words and repeat such oral imitation, instead of learning such sentence pattern simply by saying word by word.

The modern linguistic shows that the best way to master a foreign language is to repeat aural-oral practice with shorter sentences and gradually deal with longer sentences, and this may readily be realized empirically. rewinding any of the known magnetic recording-reproducing devices for language learning has required great cumbersome operations to carry out the described repetitive oral practice and this has often hampered the learner's will to learn. One such device is disclosed in U.S. Pat. No. 2,876,561, wherein each unit of teaching material stored on the teaching track of a pre-recorded tape is reproduced for the learner to listen thereto and thereafter the learner orally imitates such reproduced teaching material while recording his oral imitation on the exercise track of the tape, whereafter the tape is rewound and the exercise track of the tape is changed over into a reproducing mode. When the tape is again played back, the learner can listen to his own recorded oral exercise and compare it with the pre-recorded teaching material to find out his own defects or errors if any. The described cycle of operation may be repeated as frequently as desired. This has involved various cumbersome operations such as rewinding the pre-recorded tape by a predetermined length as well as changing over the mode of operation between the recording and reproducing modes, so that the learner's will to learn has been hampered and the efficiency of learning by repetition has been greatly reduced.

An attempt to overcome such drawback has been proposed by Japanese Pat. publication No. 16828/1964, which shows a device of the type in which a pre-recorded tape is automatically rewound by a predetermined length and changed over into the reproducing mode when the reproduction of the teaching material stored in that tape or the recording of the learner's oral exercise has been completed. This system, however, entails much complicated construction of the device, and moreover, the teaching tape employed with this system is a dual-track tape which must also serve as an exercise tape. This has often led to an undesirable result that the pre-recorded teaching material is erased inadvertently during the use of the tape. Another disadvantage of this system is that the pre-recorded tape is short-lived because it is repeatedly rewound at high speeds for the repeated oral practice. A further disadvantage is that the predetermined amount of the tape rewind does not meet the desire of advanced learners who may want to learn longer units of teaching material. Thus, the above-described system is merely nominal as the means of learning by repetition and could never provide an essentially effective educational equipment.

Also, where the magnetic recording-reproducing device of the described type is used for the purpose of dictation, it is often desired to repeatedly reproduce certain part of recorded information, whereas it has been very difficult to reproduce only such part of the recorded information. This is because the information to be reproduced is variable in length and it is very difficult to foresee the amount of the tape to be rewound or, in the case of another tape for copying and reproducing the original record, the amount of information to be copied.

SUMMARY OF THE INVENTION

It is an object of the present invention to overcome the foregoing various disadvantages inherent to the known magnetic recording-reproducing devices and to provide a novel magnetic recording-reproducing device capable of automatic repetitive reproduction in which the cycle of reproducing operation may be automatically varied in accordance with the length of the information to be repeatedly reproduced.

It is another object of the present invention to provide a magnetic recording-reproducing device capable of automatic repetitive reproduction by using a master tape storing therein information units of various lengths and time signals representing the various lengths of such information units, wherein the information units are transferred from the master tape onto a plurality of endless magnetic recording mediums having different lengths, whereafter any particular one of the endless magnetic recording mediums is reproduced in accordance with a corresponding one of the time signals to thereby repeatedly reproduce the information unit transferred on that particular magnetic recording medium at the cycle of rotation thereof.

Other objects and features of the present invention will become more apparent from the following detailed description of one embodiment when taken in conjunction with the accompanying drawings.

BRIEF DESCRIPTION OF THE DRAWINGS

FIG. 1 is a diagrammatic view schematically showing the construction of the magnetic recording-reproducing device according to an embodiment of the present invention.

FIG. 2 is a diagrammatic view illustrating the relationship between the endless tape cartridges employed with the device of FIG. 1 and the driving mechanism therefor.

FIG. 3 illustrates the positional relationship between the master tape used with the device of FIG. 1 and the magnetic heads urged into contact with the master tape.

FIG. 4 is a plan view for showing the interior of one of the cartridges in FIG. 2.

FIG. 5 is a perspective view illustrating the positional relationship between the endless tape in the cartridge of FIG. 4 and the magnetic heads urged into contact with that endless tape.

FIG. 6 is a view for illustrating the manner in which information is recorded on the master tape of FIG. 3.

DESCRIPTION OF THE PREFERRED EMBODIMENTS

Figure 7:
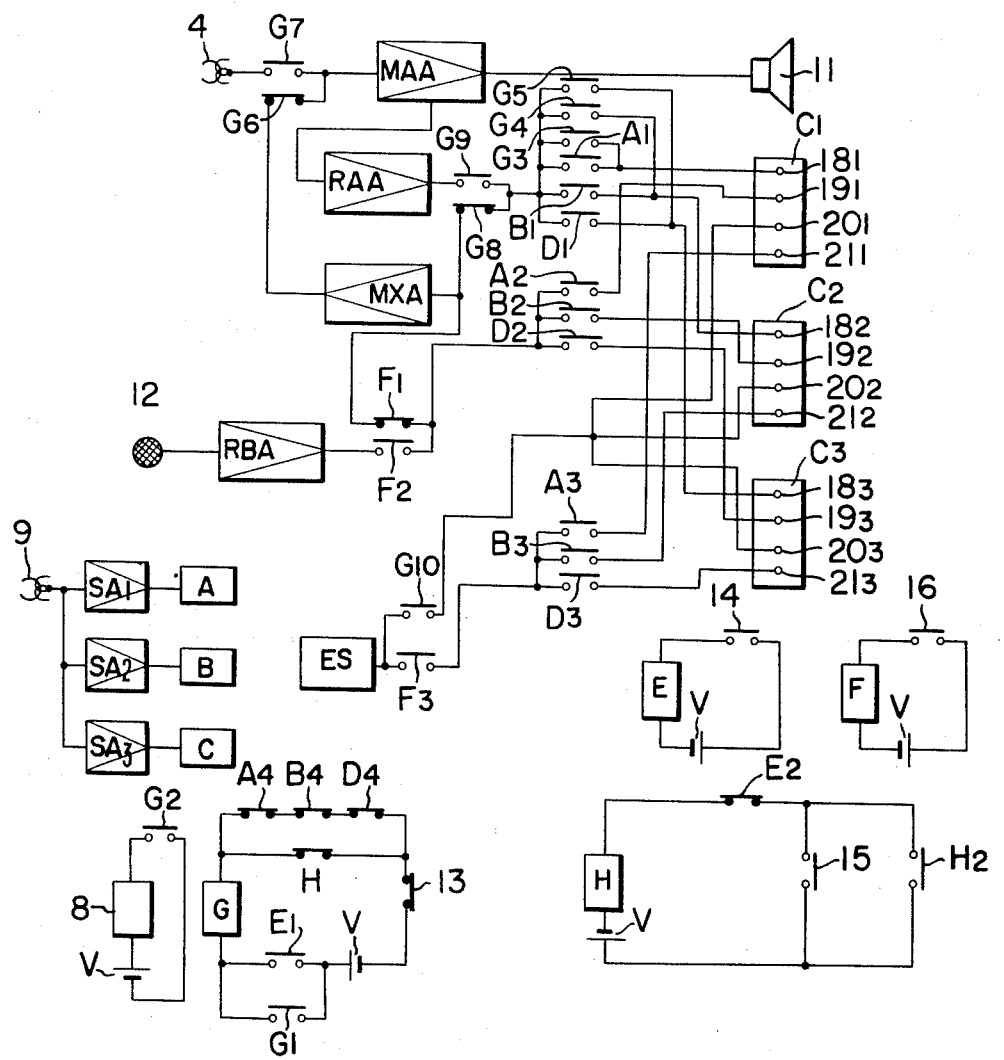
FIG. 7 is a block diagram of the electric control circuit incorporated in the device of FIG. 1.

Referring to FIG. 1, the magnetic recording-reproducing device of the present invention includes a supply reel 1 and a take-up reel 2 for supplying and taking up a master tape 3. The supply and take-up reels 1 and 2 are driven from a not-shown driving mechanism during the reproducing operation so that the tape 3 is supplied from the supply reel 1 to the take-up reel 2 via tape guides 101 and 102. The master tape 3 has two separate tracks $3_1$ and $3_2$ as schematically shown in FIG. 3. Between the tape guides 101 and 102 there are provided a reproduce head 4 adapted to be urged into contact with the upper track $3_1$ of the master tape, a capstan 5 driven to rotate at a predetermined velocity by an unshown drive motor, and a pinch roller 6 pivotally connected to a pinch roller arm 7, which is operatively connected to an actuator such as plunger 8 so that the arm 7 is actuated by the plunger 8 to urge the pinch roller 6 into contact with the capstan 5 with the master tape 3 therebetween. Adjacent to the reproduce head 4 there is mounted another reproduce head 9 adapted to be urged into contact with the lower track $3_2$ of the master tape 3. There is also provided an electric control circuit 10, which will be fully described with reference to FIG. 7, and connected with the circuit 10 are a loudspeaker 11, a microphone 12, and various change-over switches 13 to 16 for controlling the control circuit 10. The switch 13 is a stop switch, the switch 14 is a master tape play-back switch, the switch 15 is a repetitive record-reproduce switch, and the switch 16 is a record-reproduce change-over switch for endless magnetic tapes which will be described later. There are also shown three endless tape cartridges C1, C2 and C3 each containing therein an endless magnetic tape as shown in detail in FIG. 4.

Referring now to FIG. 4, the interior of the cartridge C1 is shown in plan view. The cartridge C1 includes a reel R1 rotatably mounted therein, and an endless magnetic tape T1 is extended substantially in a triangular form around the reel R1 and cylindrical tape guides G11 and G12 mounted on the bottom wall of the cartridge C1. A pinch roller arm L1 having one end thereof pivotally connected to the bottom wall of the cartridge and the other end pivotally connected to a pinch roller P1 is normally biased counter-clockwise by a not-shown spring. In the front side wall of the cartridge (or the left side wall as viewed in FIG. 4), there are formed a plurality of openings for receiving a pinch roller 17, magnetic record-reproduce heads $18_1$, $19_1$ and erase heads $20_1$, $21_1$, respectively. When the cartridge C1 is held in position in the device of FIG. 1 by cartridge retainer means, not shown, the pinch roller 17 and heads $18_1$ - $21_1$ are received in the respective openings so as to engage the endless tape T1.

The positional relationship between the magnetic record-reproduce heads $18_1$, $19_1$ and erase heads $20_1$, $21_1$ and the endless tape T1 is shown in FIG. 5. As seen, the heads $18_1$ and $20_1$ correspond to the upper track $t_{11}$ of the endless tape T1 and the heads $19_1$ and $21_1$ correspond to the lower track $t_{12}$ of the endless tape T1.

The other two cartridges C2 and C3 are similar in construction to the cartridge C1 except that they contain endless tapes T2 and T3 whose lengths differ from the length of the endless tape T1 contained in the cartridge C1. The cartridge C2 corresponds to record-reproduce heads $18_2$, $19_2$ and erase heads $20_2$, $21_2$ and the cartridge C3 corresponds to record-reproduce heads $18_3$, $19_3$ and erase heads $20_3$, $21_3$. The capstan 17 is in the form of an elongated shaft common to all three cartridges and driven from a motor 22 (see FIG. 2).

The lengths of the endless tapes T1, T2 and T3 in the respective cartridges C1, C2 and C3 are selected such that their cycles of one rotation are 3, 5 and 10 seconds, for example, respectively. In other words, the tape T2 is longer than the tape T1 and the tape T3 is longer than the tape T2, both at a predetermined ratio.

As shown in FIG. 6, the master tape 3, if it is intended for the educational purposes such as foreign language learning, may preferably be pre-recorded so that units of teaching material such as MP, MQ and so on having different lengths are recorded on the upper track $3_1$ of the tape 3 at intervals substantially corresponding to the lengths of the respective units of teaching material. Further, time control signals SP, SQ and so on having frequencies or phases corresponding to the speech signals representative of the respective units of teaching material are recorded on the lower track $3_2$ of the master tape 3 at the positions representing the terminations of the respective units of teaching material. Such time control signals SP, SQ and so on may be recorded by applying sine wave signals of three different frequencies such as 10 Hz, 20 Hz and 30 Hz for a relatively short time, say, 0.2 second, during the play back of the master tape 3.

Referring to FIG. 7, there is shown in detail the arrangement of the electric control circuit indicated at 10 in FIG. 1. The electric circuit of FIG. 7 includes a reproduce amplifier MAA, a record amplifier RAA, a mixing circuit MXA, a speech amplifier RBA, tuning amplifiers SA1, SA2 and SA3 tuning with the time control signals SP, SQ and so on of 10, 20 and 30 Hz from the reproduce head 9, relays A, B and D connected with the outputs of the respective amplifiers SA1, SA2 and SA3, a relay E connected between the master tape play-back switch 14 and a DC driving power source V and driven by the DC power source V when the switch 14 is closed, a relay F connected between the change-over switch 16 and the DC driving power source V and driven by that power source V when the switch 16 is closed, and a relay H connected with the repetitive record-reproduce switch 15 through the normally closed contact E2 of the relay E and with the DC driving power source V and having a self-holding contact H2 connected in parallel with the switch 15. The circuit of FIG. 7 further includes a relay G connected with the contact H1 of the relay H which is connected in parallel with a group of normally closed serial contacts A4, B4 and D4 of the relays A, B and D, the relay G being also connected with a contact 13 opened upon depression of the stop switch 13, and with the DC power source V through the contact E1 of the relay E. The relay G has a normally closed contact G1 connected in parallel with the contact E1. An erasing current source ES is also included in the circuit of FIG. 7.

As shown, the contacts A1–A3, B1–B3, D1–D3, F1–F2 and G3–G9 of the relays A, B, D, F, G and H are inserted between the record amplifier RAA, the mixing circuit MXA, the speech amplifier RBA and the magnetic record-reproduce heads $18_1$–$18_3$, $19_1$–$19_3$ and erase heads $20_1$–$20_3$, $21_1$–$21_3$ corresponding to the respective cartridges C1-C3. The plunger 8 is connected in series with the contact G2 of the relay G and the DC driving power source V and driven upon energization of the relay G.

Operation of the above-described magnetic recording-reproducing device will now be described by way of example with respect to a case where the device is used for the foreign language speaking training by employing the pre-recorded master tape 3 as shown in FIG. 6.

The play-back or reproducing switch 14 is first closed to energize the relay E, whose contact E1 is then closed to energize the relay G, whose contact G2 in turn is closed to drive the plunger 8. As a result, the plunger 8 with the aid of the arm 7 urges the pinch roller 6 into contact with the capstan 5 with the master tape 3 therebetween. Upon closing of the switch 14, the capstan 5 is driven to rotate by the not-shown drive motor for the take-up reel and the capstan 17 is driven to rotate by the drive motor 22, so that the tape 3 is moved at a predetermined velocity by the capstan 5. Since the contact G7 of the relay G is then closed, the reproducing output of the head 4 which is now in contact with the upper track $3_1$ of the tape 3 storing the units of teaching material MP, MQ, etc. is amplified through the reproduce amplifier MAA and vocalized through the loudspeaker 11. At the same time, the reproducing output of the reproduce amplifier MAA is applied through the record amplifier RAA and the contacts G3, G4 and G5 of the relay G to the record-reproduce heads $18_1$, $18_2$ and $18_3$ which are now in contact with the upper tracks $t_{11}$, $t_{21}$ and $t_{31}$ of the endless tapes T1, T2 and T3 in the cartridges C1, C2 and C3, whereby the units of teaching material pre-recorded on the master tape 3 are successively transferred onto the upper tracks of the endless tapes T1 to T3. On the other hand, the head 9 reproduces the time control signal SP on the master tape 3 after the head 4 has reproduced the unit of teaching material MP, and in accordance with the frequency of that control signal, for example, a frequency of 20 Hz, only a particular one of the tuning amplifiers SA1 to SA3, for example, the amplifier SA2 is operated to thereby drive the relay B alone.

The contact B4 of the relay B is open to deenergize the relay G, so that the plunger 8 is caused to disengage the pinch roller 6 from the capstan 5 and thus the master tape 3 is stopped from moving. At the same time, the energization of the relay B causes its contacts B1, B2 and B3 to be closed and the contact G8 to be opened, so that the unit of teaching material MP which has been transferred onto the upper track $t_{21}$ of the endless tape T2 in the cartridge C2 is reproduced through the circuit of head $18_2$ — contact B1 — contact G8 — mixing circuit MXA — contact G6 — reproduce amplifier MAA — loudspeaker 11. The endless tape T2 in the cartridge C2 is of such a length that the unit of teaching material MP is recorded over the entire or half length of the tape T2 in accordance with the time control signal, and this ensures the unit of teaching material MP to be completely recorded and repeatedly reproduced.

If the lengths of the endless tapes T1, T2 and T3 are substantially twice the different lengths of the respective units of teaching material to be copied, one half of the length of each endless tape may be left blank and this means that a time interval substantially equal to the length of the unit of teaching material transferred from the master tape 3 to each endless tape can be provided when the endless tapes are played back. Such time intervals may be utilized for the learner to orally imitate the units of teaching material each time when they are repeatedly reproduced.

More specifically, in order that the learner may practice his oral exercises, he first listens to the transferred unit of teaching material MP as it is reproduced, whereafter he closes the change-over switch 16 and orally imitates the teaching material toward the microphone. Thus, the relay F is energized to open its contact F1 but close its contact F2, and the speech signals representing the learner's own oral practice are applied through the speech amplifier RBA — contact F2 — contact B2 — head $19_2$ and recorded on the lower track $t_{22}$ of the endless tape T2 in the cartridge C2. Subsequently, the switch 16 is opened to open the contact F2 of the relay F but close the contact F1, so that the reproducing output of the head $19_2$ is reproduced through contact B2 — contact F1 — amplifier MXA — contact G6 — amplifier MAA — loudspeaker 11. On the other hand, the speech signals transferred on the upper track $t_{21}$ of the endless tape T2 are also reproduced through the described circuit. Thus, the transferred speech signals representing the teaching material (upper track $t_{21}$) and the speech signals representing the learner's oral imitation (lower track $t_{22}$) are reproduced one after another. The described cycle of operation may be repeated as frequently as desired, by changing over the switch 16 in the described manner, until the learner completely masters the unit of teaching material MP.

When the learner wants to learn the next unit of teaching material MQ, the play-back switch 14 is again closed as described already, so as to reproduce and transfer the unit of teaching material MQ and reproduce the transferred unit of teaching material on the endless tape in one of the cartridges C1 to C3 which corresponds to the time control signal SQ, all in the same way as described previously. To stop the operation, the stop switch 13 may be opened to deenergize the relay G and accordingly stop all the operating parts.

It will thus be noted that the various units of teaching material pre-recorded on the master tape at the intervals substantially corresponding to the lengths of these units are transferred onto the endless tapes at the same intervals. This enables the learner to reproduce the transferred units of teaching material while listening thereto, and thereafter utilize the blanks on the endless tapes to practice and record his oral exercises and then play back the endless tapes. In this way, the learner can repeatedly carry out a series of various operation cycles such as reproduction of the pre-recorded teaching material, recording of his first oral imitation, reproduction of the transferred teaching material, reproduction of his own recorded oral practice, reproduction of the transferred teaching material, and recording of his second oral imitation. During these processes, the learner can afford to devote all his attention to learning while simply changing over the mode of operation between the recording and the play back, and this greatly helps the learner to increase his learning efficiency with simple mechanical manipulation. Furthermore, when the learner wants to advance to the next unit of teaching material, one of the cartridges which contains therein an endless tape substantially twice as long as that new unit of teaching material is automatically selected so that the learner can carry out a series of operation cycles similar to those described above, without loss of time and with simple manipulation.

Further, in the described embodiment, the length of each endless tape may be substantially equal to, rather than twice, the length of each unit of information recorded on the master tape, whereby the recording-reproducing device of the present invention can be advantageously used as an equipment for dictation. Also, each endless tape continues to move round not only during the play-back operation but also during the while the master tape is stopped, and this ensures that any defective recording or reproduction is eliminated which might otherwise arise during the transient period between the stoppage and start of the endless tapes whose cycles of one rotation are very short, Thus, the endless tapes can be used highly effectively without any transient variation in tone quality, irrespective of the very short lengths of the information units recorded on the master tape and transferred onto the endless tapes and independently of the correspondingly short lengths of the endless tapes selected for such short information units.

Moreover, the time control signals provided on the master tape also serve as the master tape stop signals which automatically stop the master tape each time one information unit has been transferred from the master tape onto one endless tape, and this means a great advantage particularly in the cases where the device of the described embodiment is used for education or dictation which usually presupposes the need to repeatedly reproduce each of given information units.

Although the present invention has been shown and described as using endless magnetic tapes, it is also possible to employ any other endless type of magnetic recording medium having a similar function such as magnetic disc or drum or the like.

As has been discussed hitherto, according to the present invention, use is made of a master tape on which is recorded signals for determining the cycles of one rotation of endless magnetic mediums corresponding in length to the information units recorded on the master tape, and when it is desired to repeatedly reproduce a particular one of such information units, a particular one of the endless magnetic mediums which corresponds in length to that particular information unit is only played back. This solves the problem of loss of time which has existed in the conventional recording-reproducing devices using rather lengthy endless magnetic recording mediums for recording and reproducing short units of information.

It will also be seen in the above-described embodiment of the present invention that when the material for oral practice pre-recorded on the master tape consists of mixed longer and shorter units or sentences, each of such longer and shorter units or sentences may be separately transferred onto endless tapes so as to permit the learner to repeatedly reproduce each of them with high efficiency until he acquires to speak the given material. Of course, this serves to greatly enhance the development of the learner's speaking ability in a foreign language and is very useful to repeatedly and completely reproduce each of information units having various lengths.

What is claimed is:

1. A magnetic recording-reproducing device capable of automatic repetitive reproduction using a pre-recorded master tape storing therein information units of various lengths, comprising:

means for mounting supply and take up reels for said master tape, means for mounting a plurality of endless magnetic recording mediums having different lengths, one of said lengths corresponding to one of the various information unit lengths on said master tape, transferring means for reproducing the information units recorded on the master tape and transferring the reproduced information units onto said endless magnetic recording mediums, said endless magnetic recording mediums being driven to move at a predetermined velocity whereby they have different cycles of one rotation;

first reproducing means for selectively reproducing the information units transferred onto said endless magnetic recording mediums, said first reproducing means including change-over members adapted to be selectively operable so as to select one of the transferred information units to be reproduced; and second reproducing means for reproducing time control signals having components corresponding to the lengths of the information units recorded on said master tape, said time control signals being recorded on said master tape in accordance with the information units thereon, said second reproducing means having its output associated with said change-over members of said first reproducing means to selectively operate said change-over members;

whereby one of the endless magnetic recording mediums whose cycle of one rotation corresponds to the length of one of the information units recorded on said master tape is selected so that said one information unit transferred onto said selected endless magnetic recording medium may be reproduced repeatedly.

2. A device according to claim 1, wherein said second reproducing means includes a plurality of tuning circuits connected with said change-over members of said first reproducing means, said change-over members being selectively changed over by the outputs of said tuning circuits, and said time control signal components corresponding to the lengths of said information units differ in frequency and are composed of the tuning frequency components of said tuning circuits.

3. A device according to claim 1, wherein said transferring means includes a master tape driving member and a control circuit for said driving member, said control circuit being associated with the output of said second reproducing means so as to stop said driving member by means of the output of said second reproducing means, and said time control signals are recorded on said master tape at the positions thereof corresponding to the terminations of said information units on said master tape, whereby said master tape is stopped from moving each time said information units are reproduced.

4. A device according to claim 3, wherein said transferring means further includes a driving member for the endless magnetic recording mediums and normally drives these mediums.

5. A device according to claim 4, wherein each of said endless magnetic recording mediums comprises an endless tape, and said driving member for the endless magnetic recording mediums comprises a capstan driven from a drive source, and a pinch roller for urging said endless tape into contact with said capstan.

6. A device according to claim 5, wherein each of said endless tapes and said pinch roller are contained within a cartridge.

7. A magnetic recording-reproducing device for educational purposes capable of automatic repetitive reproduction and provided with a pre-recorded master tape storing therein units of teaching material having different lengths, comprising:

means for mounting supply and take up reels for said master tape, means for mounting a plurality of endless magnetic recording mediums having recording tracks of different lengths, one of said lengths being twice as long as one of the different information unit lengths on said master tape, transferring means for reproducing the units of teaching material recorded on the master tape and transferring the reproduced units of teaching material onto the recording tracks of said plurality of endless magnetic recording mediums, said endless magnetic recording mediums being driven to move at a predetermined velocity whereby they have different cycles of one rotation;

first reproducing means for selectively reproducing the units of teaching material transferred onto said endless magnetic recording mediums, said first reproducing means including change-over members adapted to be selectively operable so as to select one of the transferred units of teaching material to be reproduced;

second reproducing means for reproducing time control signals having components corresponding to the lengths of the units of teaching material recorded on said master tape, said time control signals being recorded on said master tape in accordance with the units of teaching material thereon, said second reproducing means having its output associated with said change-over members of said first reproducing means to selectively operate said change-over members; and recording-reproducing means for recording oral exercises separately on the other recording tracks of said endless magnetic recording mediums and reproducing said other tracks;

whereby one of the endless magnetic recording mediums whose cycle of one rotation corresponds to the length of one of said units of teaching material recorded on said master tape is selected so that said one unit of teaching material transferred onto said selected endless magnetic recording medium may be reproduced repeatedly while the speech signals representing the oral exercise may be recorded and reproduced on said selected endless magnetic recording medium.

8. A device according to claim 7, wherein said units of teaching material are recorded on said endless magnetic recording mediums at intervals separated by blank intervals substantially equal to the lengths of said units of teaching material.

* * * * *

UNITED STATES PATENT OFFICE
CERTIFICATE OF CORRECTION

Patent No. 3,703,774            Dated November 28, 1972

Inventor(s) Takeshi Goshima

It is certified that error appears in the above-identified patent and that said Letters Patent are hereby corrected as shown below:

Col. 1, lines 39, 40 and 41, for "empirically. rewinding any of the known magnetic recording-reproducing devices" read --empirically. However, any of the known magnetic recording-reproducing devices--.

Signed and sealed this 22nd day of May 1973.

(SEAL)
Attest:

EDWARD M. FLETCHER, JR.            ROBERT GOTTSCHALK
Attesting Officer            Commissioner of Patents